US006402025B1

(12) United States Patent
Shepherd et al.

(10) Patent No.: US 6,402,025 B1
(45) Date of Patent: Jun. 11, 2002

(54) DISPENSING CONTAINER

(75) Inventors: Alan G. Shepherd; John A. Peebles; Norman G. Taylor, all of Dundee; Mary L. McCarron, Scone, all of (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/433,141

(22) Filed: Nov. 3, 1999

(30) Foreign Application Priority Data

Nov. 20, 1998 (GB) ............................................ 9825509

(51) Int. Cl.[7] ................................................ G06F 17/60

(52) U.S. Cl. ....................................... 235/379; 235/381

(58) Field of Search ................................ 235/375, 379, 235/492, 380, 382, 486, 582.5; 220/268, 269, 270; 222/541, 5, 541.9, 541.6, 153.14

(56) References Cited

U.S. PATENT DOCUMENTS

| | | | | | |
|---|---|---|---|---|---|
| 3,568,875 | A | * | 3/1971 | Olan | 220/66 |
| 3,919,856 | A | * | 11/1975 | Beck | 62/60 |
| 4,444,610 | A | * | 4/1984 | Torterotot et al. | 156/264 |
| 4,529,118 | A | * | 7/1985 | Granzow et al. | 232/43.3 |
| 4,627,550 | A | * | 12/1986 | Dines | 220/306 |
| 5,012,075 | A | * | 4/1991 | Hutchison et al. | 235/379 |
| 5,094,357 | A | * | 3/1992 | Mc Kinney | 220/214 |
| 5,156,272 | A | * | 10/1992 | Bouchard et al. | 206/495 |
| 5,695,038 | A | * | 12/1997 | Keith, III et al. | 194/206 |
| 5,894,950 | A | * | 4/1999 | Kick | 220/268 |
| 6,086,576 | A | * | 7/2000 | Bisch | 606/1 |
| 6,149,955 | A | * | 11/2000 | Wilson | 426/112 |
| 6,328,355 | B1 | * | 12/2001 | Bortz | 292/307 |

FOREIGN PATENT DOCUMENTS

| | | | | |
|---|---|---|---|---|
| EP | 109265 | A | * | 5/1984 |
| EP | 101613 | A | * | 3/1999 |

* cited by examiner

*Primary Examiner*—Thien M. Le

(57) ABSTRACT

A dispensing container for storing valuable media and a self-service terminal (such as an ATM) for using these dispensing containers are described. The container has frangible portions to allow opening of the container, so that when the container is loaded into an ATM, the ATM breaks the frangible portions to define an opening through which the contents of the container are dispensed. The ATM incorporates a housing for storing these containers; a breaching mechanism for breaking the frangible portions and defining an opening; an emptying mechanism for removing valuable media from the opening; and a discharging mechanism for discarding empty containers.

22 Claims, 4 Drawing Sheets

FIG. 1
PRIOR ART
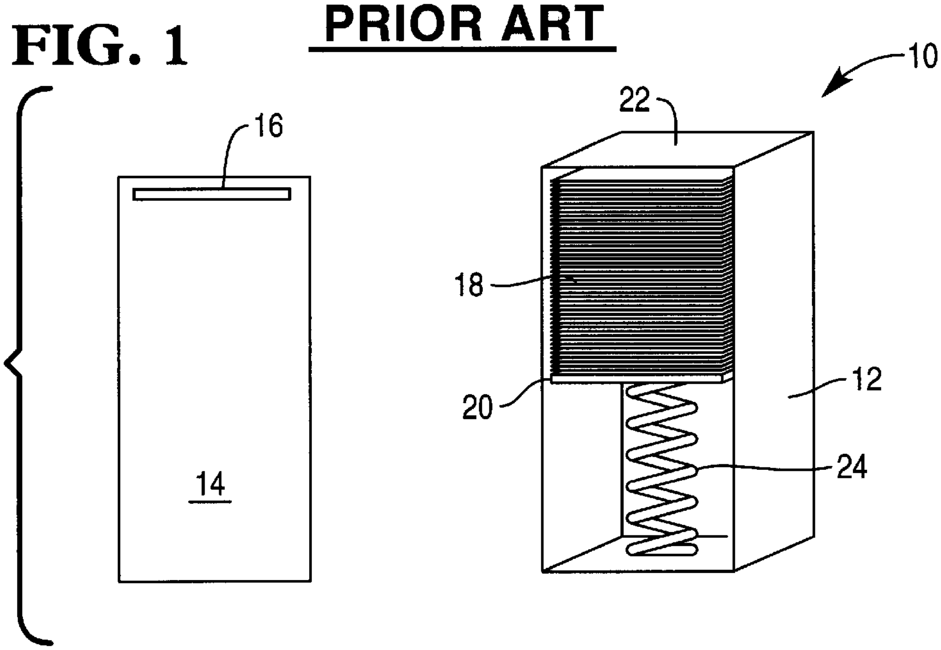
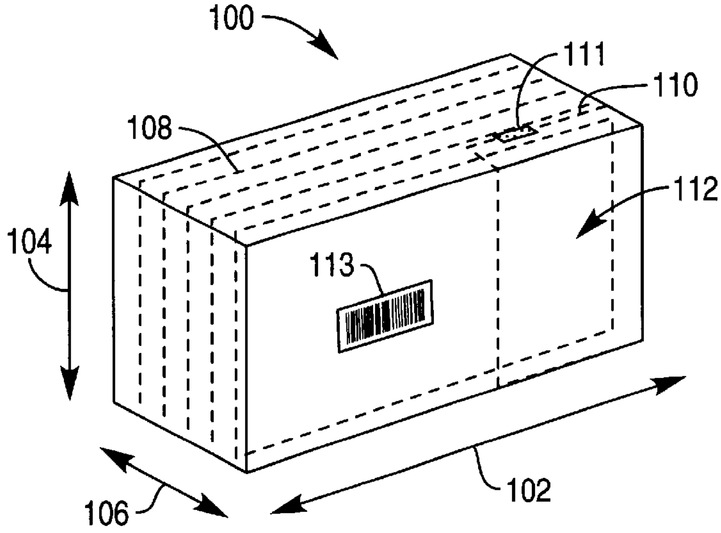
FIG. 2A
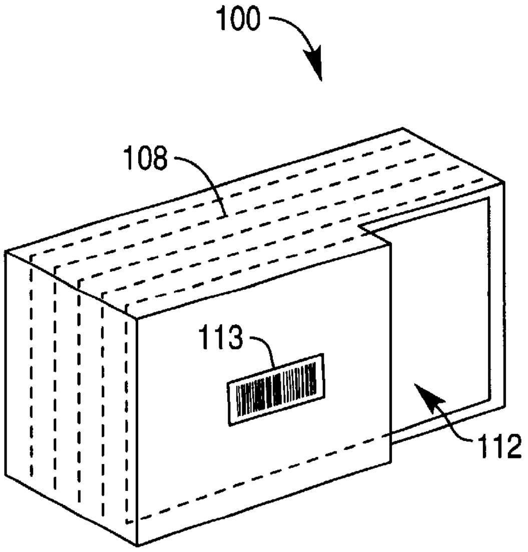
FIG. 2B

FIG. 3
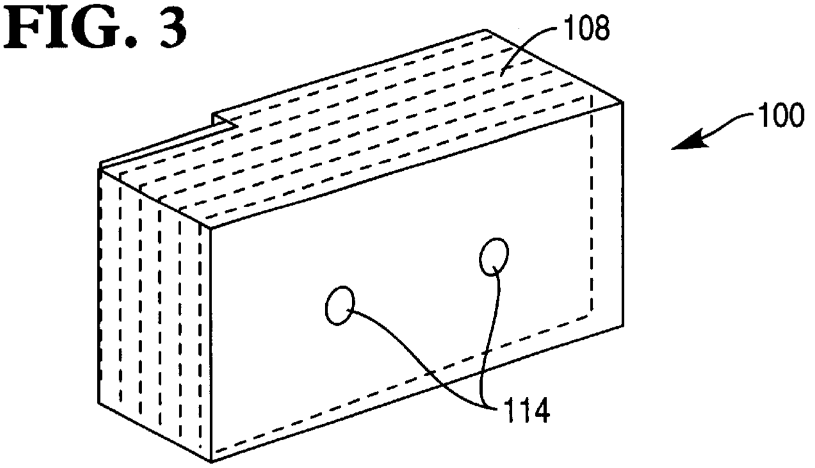
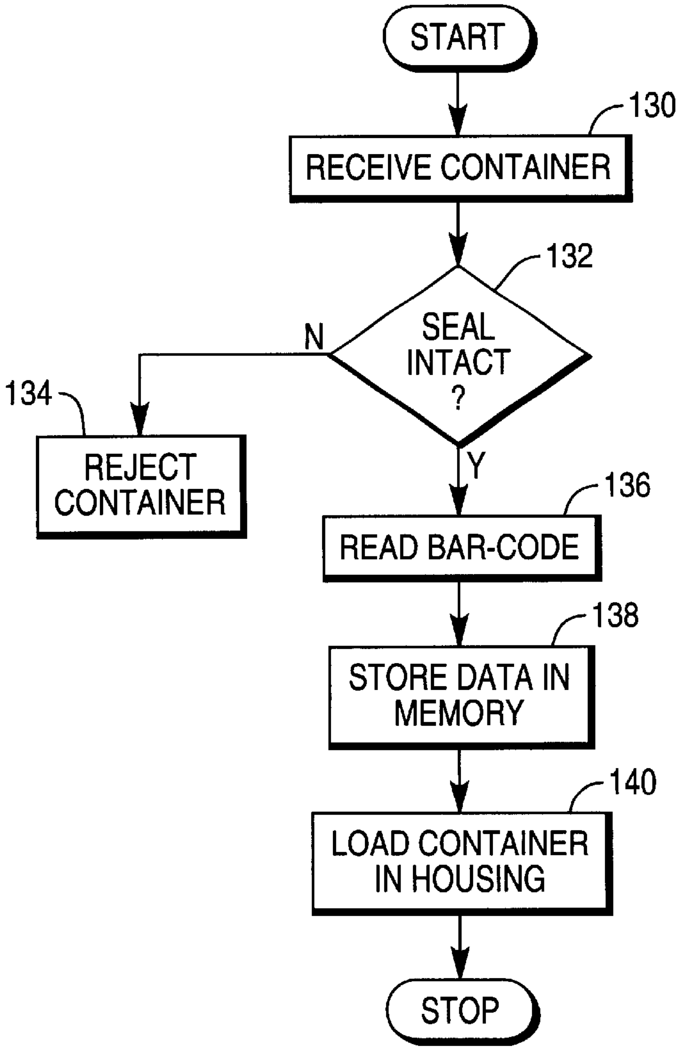
FIG. 4

DISPENSING CONTAINER

BACKGROUND OF THE INVENTION

The invention relates to a dispensing container for use with a self-service terminal (SST), and to an SST for using such a dispensing container. In particular, the invention relates to a dispensing container for storing valuable media in sheet form, such as currency, share certificates, flight coupons, and such like; and to an SST for dispensing valuable media from such dispensing containers.

Many conventional SSTs, such as Automated Teller Machines (ATMs), dispense valuable media. An ATM dispenses currency in the form of bank notes. These bank notes are stored in a reusable dispensing container called a currency cassette. A typical currency cassette is shown in FIG. 1. The cassette 10 is typically a strong metal or plastics box 12 having a removable lid 14. The lid 14 has a slot 16 (which is automatically covered when not engaged with an ATM) through which an ATM removes notes 18 from the cassette 10 in response to a cash withdrawal request initiated by a user.

The cassette 10 stores a large number of bank notes (e.g. three thousand notes) 18 in a single stack. The notes 18 rest on a plate 20 which is urged towards the top 22 of the box 12 by a spring 24. When a cassette 10 has been filled with bank notes 18 (FIG. 1 shows the cassette approximately half full) then the lid 14 is secured to the front of the cassette 10, and the cassette 10 is loaded into an ATM.

In use, when a cash withdrawal function is requested, the ATM removes one bank note at a time from the cassette 10 until the correct number of notes have been removed. When the number of notes 18 in the cassette 10 falls below a predetermined threshold then the cassette must be removed to a currency center, the contents of the cassette reconciled to ensure that all of the bank notes have been accounted for, and the cassette replenished with bank notes.

This type of cassette 10 has a number of disadvantages. Cassettes which have to be replenished still contain a number of notes and therefore must be guarded carefully when conveyed between the ATM and the replenishment center. The replenishing operation is quite complex because the remaining bank notes have to be reconciled with the number of bank notes dispensed. The cassettes are expensive. The cassettes cannot be replenished in use in an ATM. When a cassette is removed then the ATM is put out of service until a replacement cassette is inserted.

SUMMARY OF THE INVENTION

It is an object of the invention to obviate or mitigate one or more of the above disadvantages.

According to the invention, a dispensing container for dispensing valuable media in sheet form is characterized in that the container has one or more frangible portions for facilitating opening of the container, so that when the container is loaded into a self-service terminal, the one or more frangible portions can be broken to allow dispensing of the contents of the container.

The one or more frangible portions may be in the form of perforations defining one or more openings in the container.

By virtue of the invention a low cost container is provided.

Preferably, the container is intended to be only one-time usable. It will be understood that the term one-time usable means that the container is not replenished with media after use. The container may be discarded after use or it may be used in a recycling process so that old containers are re-worked to produce new containers.

Preferably, the container is made of recyclable material such as cardboard, so that after use, a discarded container may be collected and recycled for use in another container.

The container may be less than 300 mm in height (where the height is the dimension determining the number of media items that may be stored, the length and width determining the surface dimensions of the media that may be stored). Preferably, the container is less than 100 mm in height; more preferably, less than 70 mm in height; advantageously, less than 50 mm in height; most preferably, less than 30 mm in height. The advantage of having a low height container is that fewer notes can be stored, therefore, the security risk involved in transporting the container is reduced.

Preferably, the container has a tamper evident construction. Conveniently, the tamper evident construction is implemented by having a seal which is highly visible when broken.

Preferably, the container has a machine-readable identifier. Conveniently, the machine-readable identifier is a barcode including information such as the number of notes stored in the container, the denomination of notes stored. Alternatively, the machine-readable identifier is an electronic tag.

According to the invention a self-service terminal is characterized in that the terminal incorporates

- a housing for storing containers;
- a breaching mechanism for providing an opening in the containers;
- an emptying mechanism for removing valuable media from the opening in the containers; and
- a discharging mechanism for discarding empty containers.

Preferably, only one container in the housing is open at a time, so that a container is only opened if the previous container has been emptied. Alternatively, a second container may be opened when the number of valuable media items in a first container falls below a predetermined level.

Preferably, the breaching mechanism breaks one or more frangible portions in a container.

Preferably, the housing automatically presents a container to the emptying mechanism so that when the discharging mechanism discards an empty container the housing presents another container to the emptying mechanism.

Conveniently, the housing stores the containers in a stack arrangement with the bottom container adjacent the emptying mechanism so that as a container is discarded the adjacent container falls towards the emptying mechanism. In other embodiments, the housing may store the containers in other configurations, for example a generally horizontal configuration or a circular configuration.

The emptying mechanism may be a conventional pick mechanism as used in conventional ATMs.

The discharging mechanism may be an actuatable support plate.

Preferably, the SST further comprises a charging slot for receiving one or more containers from an owner of the SST; and a charging mechanism for loading the housing with the received containers. This feature has the advantage that the media within an SST can be replenished by the owner adding one or more containers without having to shut down or open up the SST.

Preferably, the SST further comprises a testing mechanism for verifying the integrity of a tamper evident seal. The testing mechanism may be responsive to the charging mechanism so that each received container is tested and only conveyed to the housing if the tamper evident seal is intact. Any container failing the verification may be retained or returned to the owner.

Preferably, the SST further comprises auditing means for reconciling on a per container basis the amount of media in a container with the amount of media dispensed by the SST from that container. The advantage of this is that the contents of each container can be audited immediately after dispensing the last media item from a container. If the number of media items dispensed equals the number of media items originally in the container then the next container may be opened. If the contents of the container are not reconciled with the number of media items dispensed then the media dispensing facility may be temporarily stopped until the SST is examined.

It will be appreciated that one feature of the invention is that the dispensing container does not have any urging means for urging media to one surface of the container: the urging means is incorporated in the SST into which the container is loaded.

Another feature of the invention is that reconciliation and auditing is performed automatically by the SST and only has to be performed manually in cases where the automatic audit fails to reconcile the media dispensed with the media in a dispensing container. When these dispensing containers are used in an ATM they greatly increase the flexibility of the number and types of bank notes that can be dispensed.

Yet another feature of the invention is that an ATM using these containers can selfreconcile after each container has been emptied.

A further feature of the invention is that an ATM using such containers generally only requires movement of cash to the ATM, not from the ATM to a currency center; this obviates the requirements for high security transportation from the ATM to the currency center.

BRIEF DESCRIPTION OF THE DRAWINGS

FIG. 1 is a perspective view of a prior art currency cassette for use in an ATM.

Figure 5:
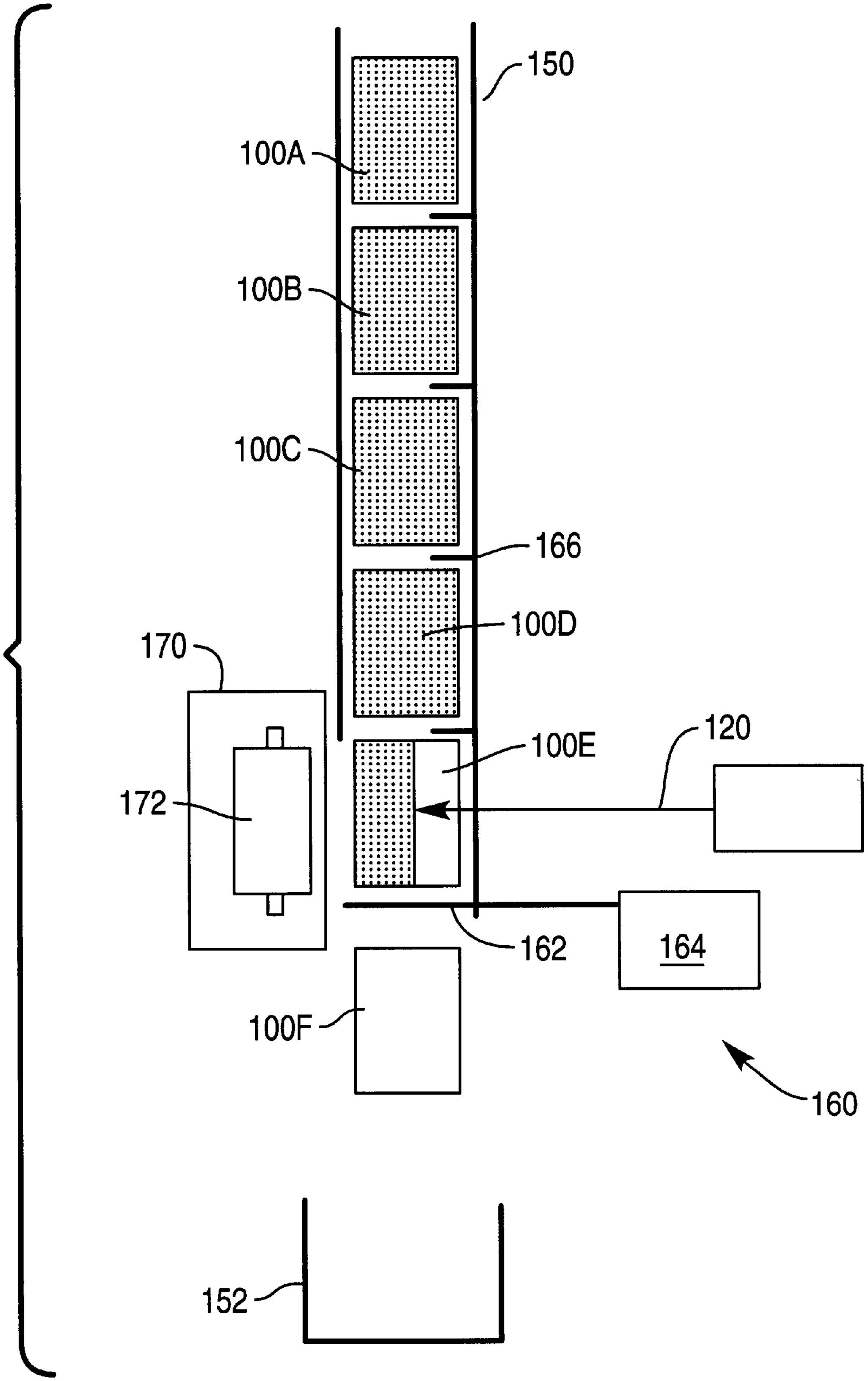
Figure 6:
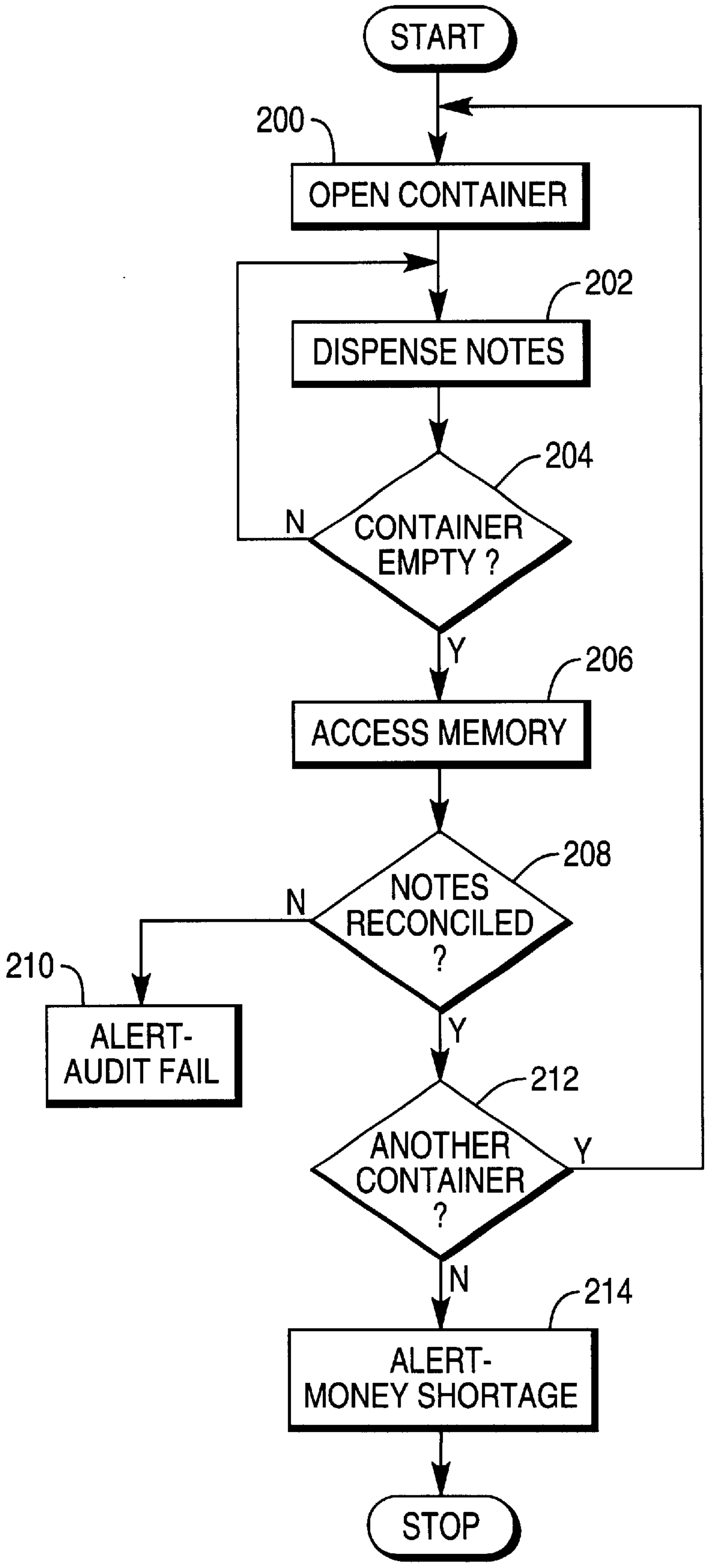

An embodiment of the present invention will now be described, by way of example, with reference to the rest of the accompanying drawings, in which:

FIGS. 2A and 2B are front perspective views of a dispensing container according to one embodiment of the invention, before and after the container is opened;

FIG. 3 is a rear perspective view of the dispensing container of FIG. 2B;

FIG. 4 is a flowchart showing the steps performed by an ATM when it receives a dispensing container;

FIG. 5 is a schematic view of part of an ATM according to one embodiment of the invention; and FIG. 6 is a flowchart showing the steps performed by an ATM when dispensing bank notes from a container.

DETAILED DESCRIPTION

Referring first to FIGS. 2A and 2B, a dispensing container 100 in the form of a currency container is shown. The container 100 is made of cardboard and measures approximately 160 mm long (dimension 102), 100 mm broad (dimension 104), and 30 mm high (dimension 106). The container 100 is filled with bank notes 108 (shown in dotted line) which are stacked in the container 100 as shown. The front of the container 100 has a frangible portion 110 in the form of a perforated strip extending around parts of four surfaces of the container 100 to define an opening 112.

FIG. 2B shows the container 100 with the perforated strip 110 broken and the portion of cardboard defined by the strip 110 removed to reveal the opening 112. When the perforated strip 110 is broken and the cardboard removed one bank note 108 is exposed by the opening 112.

The perforated strip 110 has a tamper evident seal 111 so that on loading into an ATM, the ATM can determine whether the container 100 has been tampered with. A bar-code 113 (FIGS. 2A and 2B) may be applied to one or more of the surfaces of the container 100 so that an ATM can automatically read the bar-code 113 on loading the container 100 into the ATM. Typically, the bar-code 113 would contain information such as the type of notes in the container 100 and the number of notes in the container 100.

FIG. 3 shows a rear perspective view of the container 100. The rear of the container 100 has two apertures 114 for receiving pushing rods 120 (FIG. 5) for urging the bank notes 108 towards the front of the container 100.

FIG. 4 is a flowchart illustrating the steps performed by an ATM when a container 100 is loaded into the ATM. The container 100 is loaded into the ATM via a container deposit drawer in the ATM. The ATM receives the container 100 (step 130) and verifies that the tamper evident seal 111 is intact (step 132). If the seal 111 is not intact then the container is rejected (step 134); if the seal is intact then the bar-code 113 on the container 100 is read (step 136). The data read from the bar-code 113 is then stored in a memory (the memory is not shown) (step 138) and the container 100 is conveyed to a housing for storage (step 140).

FIG. 5 is a schematic view of part of an ATM and shows a housing 150 for storing containers 100 in a stack. Five containers 100*a,b,c,d,e* are shown stored in the housing 150, and one container 100*f* is shown being discharged from the housing 150 into a receptacle 152. In FIG. 5 the dark shading in each container 100 indicates how full of bank notes that container is.

A discharging mechanism 160 is located at the bottom of the housing 150. The discharging mechanism 160 comprises a support plate 162, an actuator 164, and actuatable separating fingers 166. The lowest of the five stored containers 100*e* is supported by plate 162 and the other containers are spaced apart by the separating fingers 166.

When a container (e.g. 100*f*) is empty then it is discarded into receptacle 152. This is implemented by the support plate 162 being retracted from the housing 150 by actuator 164. This causes the container 100f to fall into receptacle 152 under the influence of gravity. The support plate 162 is then inserted into the housing 150. The lowest separating finger 166 is then retracted to allow container 100*e* to fall to the position previously occupied by container 100*f*; the lowest separating finger 166 is then returned to its original position. The second lowest separating finger 166 is then retracted to allow container 100*d* to fall to the position previously occupied by 100*e*. This process continues until all of the containers 100 have moved down the housing 150. Thus, the containers 100 ripple down the housing each time that a container 100 is ejected from the housing.

FIG. 6 shows the process steps involved in dispensing notes from the containers 100 and in loading new containers 100.

Referring to FIG. 5 and FIG. 6, as container 100*e* arrives at the plate 162, a breaching mechanism 170 engages the container 100e and removes the perforated strip 110 to define the window 112 (step 200). An emptying mechanism 172 in the form of a conventional ATM pick wheel is then aligned with the opening 112 for removing individual bank notes 108 from the container 100*e* (step 202). Notes are dispensed in response to cash withdrawal requests until the container 100*e* is empty (steps 202 and 204).

When the container 100*e* is empty (i.e. when the last bank note 108 has been dispensed) then the support plate 162 is retracted by the actuator 164 and the empty container 100*e* falls into receptacle 152 for disposal or recycling.

The ATM accesses the memory storing the bar-code information (step 206) and attempts to reconcile (step 208) the number of notes dispensed from container 100*e* with the number of notes in the container 100*e* as stated in the bar-code information (stored in memory).

If the number of notes dispensed does not equal the number of notes stated to be in the container 100*e* then an audit fail message is generated (step 210). If the number of notes dispensed equals the number of notes stated to be in the container 100*e* then the ATM proceeds to load the next container 100*d* (step 212) and the above procedure is repeated. If there are no more containers 100 then a money shortage message is generated (step 214) to notify the owner of the ATM that more containers 100 are required.

The auditing and reconciling procedure may be performed by the ATM processor as ATMs record every transaction for auditing purposes.

Using containers 100 in an ATM ensures that the only reverse cash in transit is from the reject bin (a standard feature on all ATMs for storing bank notes which have not dispensed properly): there are no partially filled currency cassettes.

Various modifications may be made to the above described embodiments within the scope of the present invention. For example, in other embodiments, other configurations of housings may be used; for example, the housing may be configured so that containers are stored in a rotary arrangement. The frangible portions may be in the form of, for example, one or more weakened sections in the container, or one or more straps which maintain a flap in a closed position. In other embodiments, the containers may dispense share certificates, stamps, tickets, and such like.

What is claimed is:

1. A dispensing container for dispensing valuable media in sheet form, the container comprising:

one or more frangible portions for facilitating opening of the container, the one or more frangible portions being breakable to allow dispensing of the contents of the container when the container is loaded into a self-service terminal.

2. A container according to claim 1, wherein the one or more frangible portions includes perforations defining one or more openings in the container.

3. A container according to claim 1, wherein the container has a tamper evident construction.

4. A container according to claim 1, further comprising a machine-readable identifier.

5. A self-service terminal (SST) comprising:

a housing for storing containers;

a breaching mechanism for providing an opening in the containers;

an emptying mechanism for removing valuable media from the opening in the containers; and a discharging mechanism for discarding empty containers.

6. A self-service terminal according to claim 5, wherein the breaching mechanism breaks one or more frangible portions in a container.

7. A self-service terminal according to claim 5, wherein the housing automatically presents a container to the emptying mechanism so that when the discharging mechanism discards an empty container the housing presents another container to the emptying mechanism.

8. A self-service terminal according to claim 5, further comprising (i) means defining a charging slot for receiving one or more containers from an owner of the SST, and (ii) a charging mechanism for loading the housing with the received containers.

9. A self-service terminal according to claim 5, further comprising a testing mechanism for verifying the integrity of a tamper evident seal.

10. A self-service terminal according to claim 5, further comprising auditing means for reconciling the amount of media in a container with the amount of media dispensed from that container.

11. A self-service terminal according to claim 5, wherein the housing stores the containers in a stack arrangement with the bottom container adjacent the emptying mechanism.

12. A self-service terminal according to claim 5, further comprising urging means for urging the contents of a container to one surface of the container.

13. A self-service terminal according to claim 5, wherein the discharging mechanism includes an actuatable support plate.

14. An automated teller machine (ATM) comprising:

a housing for storing bank note cassettes;

a breaching mechanism for providing an opening in the bank note cassettes;

an emptying mechanism for removing valuable media from the opening in the bank note cassettes; and a discharging mechanism for discarding empty bank note cassettes.

15. An ATM according to claim 14, wherein the breaching mechanism breaks one or more frangible portions in a bank note cassette.

16. An ATM according to claim 14, wherein the housing automatically presents a bank note cassette to the emptying mechanism so that when the discharging mechanism discards an empty bank note cassette the housing presents another bank note cassette to the emptying mechanism.

17. An ATM terminal according to claim 14, further comprising (i) means defining a charging slot for receiving one or more bank note cassettes from an owner of the ATM, and (ii) a charging mechanism for loading the housing with the received bank note cassettes.

18. An ATM according to claim 14, further comprising a testing mechanism for verifying the integrity of a tamper evident seal.

19. An ATM according to claim 14, further comprising auditing means for reconciling the amount of media in a bank note cassette with the amount of media dispensed from that bank note cassette.

20. An ATM according to claim 14, wherein the housing stores the bank note cassettes in a stack arrangement with the bottom bank note cassette adjacent the emptying mechanism.

21. An ATM according to claim 14, further comprising urging means for urging the contents of a bank note cassette to one surface of the bank note cassette.

22. An ATM according to claim 14, wherein the discharging mechanism includes an actuatable support plate.

* * * * *